Patented Dec. 29, 1931

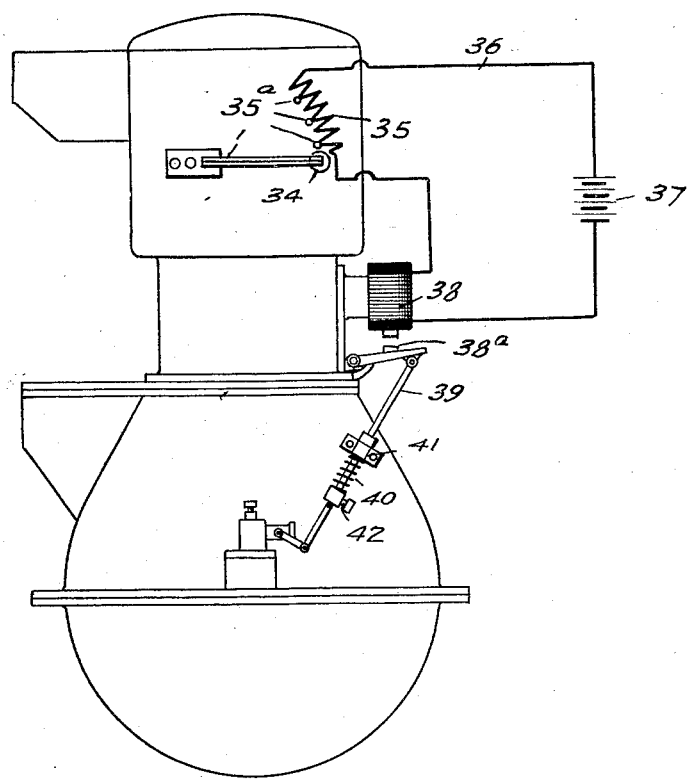

1,838,409

UNITED STATES PATENT OFFICE

ALEXANDER H. KING AND EARLE A. RYDER, OF WEST HARTFORD, CONNECTICUT, ASSIGNORS TO THE PRATT & WHITNEY AIRCRAFT COMPANY, OF HARTFORD, CONNECTICUT

INTERNAL COMBUSTION ENGINE

Original application filed June 5, 1928, Serial No. 283,081. Divided and this application filed August 31, 1929. Serial No. 389,784.

This invention relates in general to internal combustion engines and is more particularly concerned with thermostatic controls governing the operation of the same between certain ranges of combustion cylinder temperatures. This invention is a division from our orginal application, Serial Number 283,081, filed June 5, 1928, and is especially directed to the thermostatic devices as applicable to spark adjustment control, throttle control, and mixture control.

Internal combustion engines have a tendency to overheat under conditions of excess load, incorrect carburetion due to the use of low grade fuels or improper adjustment of fuel proportions, incorrect spark timing and other adverse conditions. Such conditions frequently cause detonation, which in turn causes further overheating, poor lubrication, loss in horsepower output and the final seizing of the pistons within their cylinders and the destruction of the engine.

It is well recognized that failure of an engine due to overheating is due to excessive temperature of the cylinder head or cylinder walls, and this excessive temperature may be caused either by high combustion temperature, deficiency of the cooling system, or a condition such as detonation, which causes a disproportionate part of the heat of combustion to be transferred to the cylinder walls.

The prior art contains efforts to regulate engine temperatures by control of the cooling means, as, for example, thermostatic control of the cooling water circulation. Such means are effective to maintain a certain minimum temperature which may be desirable for operation, but are powerless to limit the maximum temperature of the combustion chamber or cylinder whenever the conditions of operation cause the evolution and transfer to the cylinder walls of more heat than the cooling system is capable of absorbing.

In order to remove the danger which might otherwise arise from excess loads, poor fuel selection, improper spark timing, deficiency of the cooling system or other causes of overheating, it is the purpose of this invention to provide a means, governed by cylinder temperature, for controlling the amount of heat supplied to the cylinder walls. In general any control is effective which operates to reduce the pressure and/or temperature of combustion; or to prevent detonation if conditions likely to cause detonation are present.

Combustion temperature and effective combustion pressure may be lowered, and detonation, if any, may be reduced by partially closing the throttle, retarding the spark, enriching the fuel mixture, or by various combinations of the movements of these controls. It is, therefore, an object of this invention to provide a thermostatic means for automatically controlling the movement, within certain limits, of any or all of these three controls.

It is the prime object of this invention to provide a thermostat in thermal communication with a multicylindered engine, and electrical means for translating the movements of the thermostat into positive actuation of the engine operating controls in the manner required to reduce effective combustion pressure.

It is a further object of this invention to so adapt this electrical means that it shall be ineffective on said controls at normal running temperatures but will become increasingly effective as the average temperature of the cylinders of said engine rises above a predetermined point.

Other objects of this invention will appear in the accompanying specification and claims and will be disclosed in the accompanying drawing in which—

The figure is an end elevation of a multicylindered internal combustion engine of the water-cooled type with our device attached and shown diagrammatically.

Referring now to the drawing it will be seen that we have provided a thermostat 1 preferably, though not necessarily, comprised of two metals of different coefficients of expansion. The thermostat is mounted in thermal communication with the water jacket of the engine and in this case is shown as having one of its ends fixedly secured to a cylinder of the engine. The free end of the thermostat has an electrical contact member 34 secured thereto, a rheostat 35, having a plurality of contacts 35a, is fixed to but insulated from the engine cylinder, the contacts 35a being positioned so as to be engaged successively by the contact 34 upon an excessive rise in cylinder temperature. These contacts form the terminals of an electrical circuit which includes the leads 36, a source of electrical energy, illustrated as a battery at 37, and a solenoid 38.

As disclosed the solenoid armature 38a is illustrated as mechanically connected to an engine control rod 39 which may be for the throttle control, the spark control, the mixture control, or any combination of the three. Intermediate of its ends the rod 39 is provided with a concentrically mounted compression spring 40. This spring lies between a loose guide 41, fixed to the engine and a set collar 42, adjustably fixed to the rod. Upward movement of the solenoid armature will result in a compression of this spring, the degree of compression being governable by the position of the collar 42 along the rod 39.

If it is desired, a relay may be substituted for the solenoid and the relay be used for controlling the operation of any additional power means for operating either of the three engine controls hereinabove specified.

From the foregoing the operation of my device will be understood to be as follows:

When the engine temperature increases the thermostat will move in a direction toward the rheostat 35, contacting with the first contact disk thereon when the temperature of the engine reaches the minimum excessive temperature. The circuit then being closed the solenoid will operate to draw its armature toward it against the action of the spring 40, thus actuating the engine control. As the temperature increases the contact 34 will contact with the second contact disk and a greater current sent through the circuit, resulting in magnifying the attraction of the solenoid and the action on the engine control.

The drawing in this case has been described as an end elevation of a multicylindered engine of the water-cooled type. The thermostat will, therefore, be actuated by the average temperature of all of its cylinders and but a single thermostat will be necessary.

Having thus described our invention what we claim is—

1. In combination, with an internal combustion engine having an engine operating control, a thermostat mounted in thermal communication with said engine, and electrically operated means operatively connecting said thermostat and said engine control to actuate the latter when the engine temperature reaches a predetermined degree, and resiliently yieldable means opposing the action of said electrically operated means, said electrical means being formed to exercise an increasingly greater degree of force upon said engine controls as the temperature increases above a predetermined degree.

2. In combination, with an internal combustion engine having an engine operating control, a thermostat mounted in thermal communication with said engine, and electrically operated means operatively connecting said thermostat and said engine control to actuate the latter when the engine temperature reaches a predetermined degree, said means being adapted to permit of normal temperature increases without affecting said control, and resiliently yieldable means opposing the action of said electrically operated means, said electrical means being formed to exercise an increasingly greater degree of force upon said engine controls as the temperature increases above a predetermined degree.

3. In combination, with an internal combustion engine having an engine operating control, a thermostat mounted in thermal communication with said engine, and electrically operated means operatively connecting said thermostat and said engine control to actuate the latter when the engine temperature reaches a predetermined degree, and resiliently yieldable means opposing the action of said electrically operated means, said electrical means being formed to exercise an increasingly greater degree of force upon said engine controls as the temperature increases above a predetermined degree, and means for adjusting said resilient means to vary the degree of its opposition to said electrical means.

4. In combination, with an internal combustion engine having an engine operating control, a thermostat mounted in thermal communication with said engine, and electrically operated means operatively connecting said thermostat and said engine control to actuate the latter when the engine temperature reaches a predetermined degree, said means being adapted to permit of normal temperature increases without affecting said control, and resiliently yieldable means opposing the action of said electrically operated means, said electrical means being formed to exercise an increasingly greater degree of force upon said engine controls as the temperature increases above a predetermined degree, and means for adjusting said resilient means to vary the degree of its opposition to said electrical means.

5. In combination, with a multi-cylindered internal combustion engine having an engine operating control, a thermostat mounted in thermal communication with said engine, and electrically operated means operatively connecting said thermostat and said engine control to actuate the latter when the engine temperature reaches a predetermined degree, said means being adapted to permit of normal temperature increases without affecting said control, and resiliently yieldable means opposing the action of said electrically operated means, said electrical means being formed to exercise an increasingly greater degree of force upon said engine controls as the temperature increases above a predetermined degree, said thermostat being actuated by the average temperature of all of the cylinders of said engine.

6. In combination, with a multicylindered internal combustion engine having an engine operating control, a thermostat mounted in thermal communication with said engine, and electrically operated means operatively connecting said thermostat and said engine control to actuate the latter when the engine temperature reaches a predetermined degree, said means being adapted to permit of normal temperature increases without affecting said control, and resiliently yieldable means opposing the action of said electrically operated means, said electrical means being formed to exercise an increasingly greater degree of force upon said engine controls as the temperature increases above a predetermined degree, and means for adjusting said resilient means to vary the degree of its opposition to said electrical means, said thermostat being actuated by the average temperature of all of the cylinders of said engine.

In testimony whereof we have affixed our signatures.

EARLE A. RYDER.
ALEXANDER H. KING.